United States Patent [19]

Maines

[11] Patent Number: 5,421,599
[45] Date of Patent: Jun. 6, 1995

[54] SHOCK ABSORBING APPARATUS FOR TOW COUPLERS

[76] Inventor: Ben C. Maines, P.O. Box 3571, Longview, Tex. 75606

[21] Appl. No.: 159,688

[22] Filed: Nov. 30, 1993

[51] Int. Cl.⁶ .................. B60D 1/167; B60D 1/32
[52] U.S. Cl. .................. 280/406.2; 280/482; 280/491.2
[58] Field of Search .............. 280/482, 486, 487, 483, 280/491.1, 491.2, 491.3, 461.1, 406.1, 406.2, 479.2, 493

[56] References Cited

U.S. PATENT DOCUMENTS

| | | | |
|---|---|---|---|
| 1,447,146 | 2/1923 | Novak | 280/486 |
| 2,585,768 | 2/1952 | Ham | 280/502 |
| 2,709,604 | 5/1955 | Hartman | 280/406.1 |
| 2,729,467 | 1/1956 | Reese | 280/406.2 |
| 2,783,039 | 2/1957 | Wilson | 280/486 |
| 4,258,930 | 3/1981 | Hess | 280/508 |
| 4,611,821 | 9/1986 | Jeanson et al. | 280/482 |

FOREIGN PATENT DOCUMENTS

| | | | |
|---|---|---|---|
| 1202370 | 7/1959 | France | 280/486 |
| 334193 | 12/1958 | Switzerland | 280/486 |
| 1500512 | 8/1989 | U.S.S.R. | 280/491.2 |

*Primary Examiner*—Mitchell J. Hill
*Attorney, Agent, or Firm*—Charles W. Alworth; Ronald B. Sefrna

[57] ABSTRACT

The invention discloses a telescoping shock absorbing apparatus which uses a pair of square tubular members with a rod disposed interiorly and axially within one of the members for transmitting towing force. Two springs are disposed over and connected to the rod and square members to absorb shock resulting from differential movement that would otherwise be transmitted between the two vehicles. The towing vehicle experiences hardly any shock through the connection to a towed vehicle, substantially improving the operating conditions for both vehicles. The disclosure shows how this apparatus may be used on various conventional tow bars and shows how existing folding tow couplers can be improved through the use of the apparatus.

21 Claims, 19 Drawing Sheets

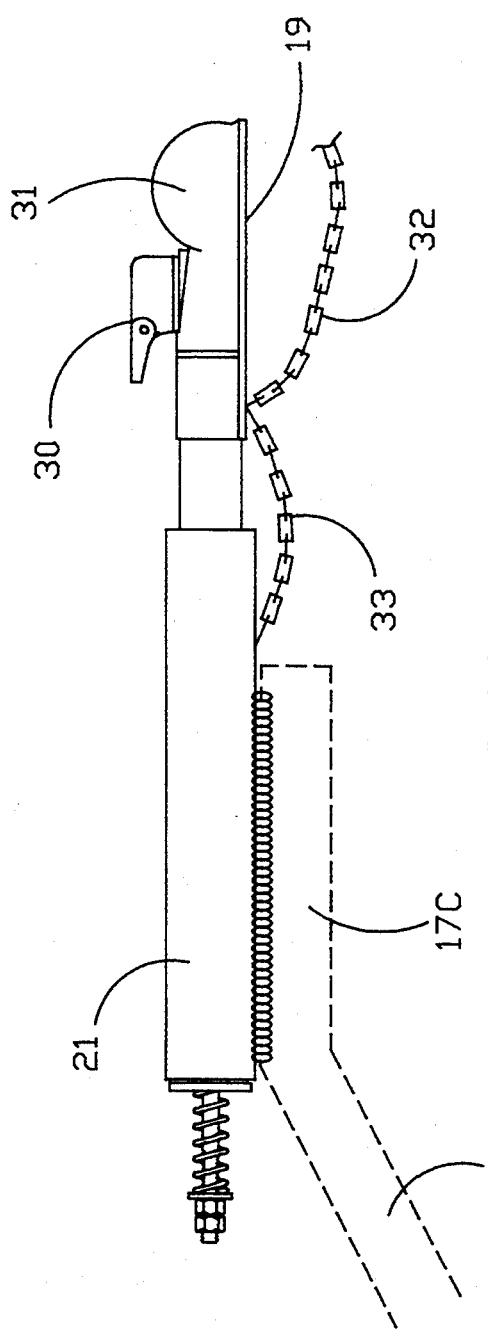
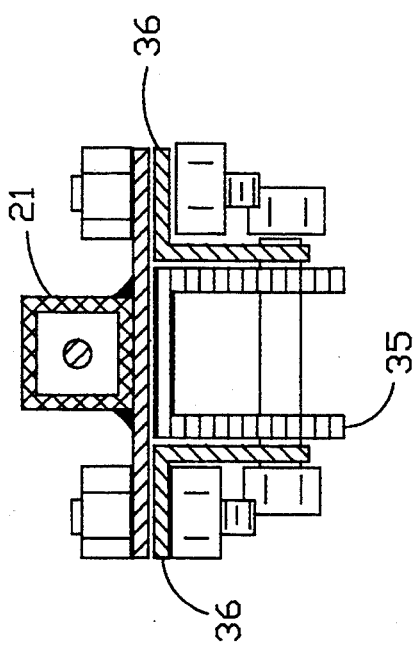
FIGURE 2C
FIGURE 2E

SHOCK ABSORBING APPARATUS FOR TOW COUPLERS

FIELD OF THE INVENTION

The invention generally relates to towing hitches and couplers; and, in some of its embodiments more specifically relates to a shock absorber system for tow couplers and trailer couplers which reduces stress on the towing and towed vehicles and coupler thus resulting in a safer device. An embodiment of the invention also relates to an improved folding tow coupler which incorporates the shock absorber and facilitates storage of the tow coupler.

BACKGROUND OF THE INVENTION

Modern Americana has increased its use of recreational vehicles. Many American citizens can be found on the road using a self propelled motor home while towing a smaller vehicle behind their home. Upon arrival at a suitable camp site the towed vehicle is detached from the home and used for local transportation. Most campers will detach the towing coupler and store it under the mobile home where it could be stolen. This problem has been resolved by designing a tow coupler that is permanently attached to the towed vehicle, folding it in place and driving away with the coupler attached. This invention improves an existing folding tow coupler to allow use with the shock absorber device.

Tremendous mechanical abuse is suffered by both vehicles when one vehicle is towing another. Road conditions such as bumps, chuckholes, dips and wallowing pavement are all transmitted between the towed vehicle and towing vehicle by the standard tow coupler—be it a fixed or folding coupler. This invention improves the towing coupler by adding a shock absorbing device specifically designed to reduce the shock, the tugging, the pushing, and the surge loads that are transmitted between and imposed on the two vehicles. The tow coupler adds an important safety feature in that reduction of these transmitted loads substantially eliminates the possibility of metal fatigue in the tow coupler assembly. In fact there have been a number of occurrences where metal fatigue at the point of attachment to the towing vehicle has resulted in serious injury accidents.

The shock absorbing device would be very useful when used on the tongue of livestock or horse trailers. Animals are very sensitive to shock and movement while contained within the confines of trailers. The shock absorber device will lessen the back and forth bounce which is transmitted between two vehicles thus improving traveling conditions for prize animals.

A properly designed tow coupler used between a towed vehicle and a towing vehicle must have the following features:
a) the tow coupler must be able to transmit the towing force from the towing vehicle to the towed vehicle in order to allow the towed vehicle to be pulled along;
b) the tow coupler must be able to transmit any turning force so the towing vehicle can go ahead with its usual turning operations and be assured that the towed vehicle will properly follow;
c) the tow coupler should eliminate the transmitted shock loads between the two vehicles caused by any encountered road conditions; and,
d) if the tow coupler is of the folding variety, the coupler must safely accomplish the above features without collapsing.

PRIOR ART

Tow coupler systems are well known in the art and the prior art technology will be discussed in two parts—shock absorber systems and folding tow coupler systems. In the area of tow coupler shock absorber systems the closest prior art known to the Applicant includes U.S. Pat. Nos. 1,447,146; 2,585,768; 2,709,604; 2,729,467; 2,783,039; and 4,258,930. These prior art systems are generally designed to absorb the shock load imposed by coupling up to a trailer, to damp the standard oscillations caused by road conditions, and to shift the downward load imposed by a trailer to the front of the towing vehicle. None of the prior art envisioned the smooth transfer of stresses caused by modern highway speed conditions.

U.S. Pat. No. 4,258,980 (Hess) discloses a [trailer] Hitching Device with Safety Lock. Hess defines a device, which includes (and claims as an obvious afterthought) a shock absorber system, for remotely hitching and unhitching a farm implement. The shock absorber system is meant to absorb the shock imposed upon backing into a hitched trailer. The Hess hitch is designed to attach to the towing vehicle and as a consequence the shock absorber will not radially follow imposed shocks when the towed vehicle is rounding a turn. This means that a side-to-side load will be imposed on the towing vehicle and thus shock loads will be transferred between both vehicles in a turn.

Hess discloses a square tubular telescoping shock absorber system but the disclosure does not teach the inclusion of sufficient telescoping material to withstand the side loads imposed by modern high speed driving. The disclosed apparatus uses two springs as the shock absorbing mechanism in a push-pull arrangement which is held in place by a single mounting nut and is contained entirely within the telescoping mechanism. Hess uses a rather complex guide system for the pulling spring, admits that the guide system could jam, and then adds an anti-jamming lip to the guide system. The resulting push-pull spring and guide system is difficult to manufacture and assemble. Finally, the Hess disclosure does not allow for nor consider adjustment of the shock absorber damping coefficient by allowing for adjustment of the spring tension. In fact, in Hess, it is impossible to adjust the spring tension after manufacture; because, the nut which could be used for such adjustment is contained within the spring guide assembly within the telescoping shock absorber.

U.S. Pat. No. 2,783,039 (Wilson) discloses a Trailer Hitch Shock Absorber that uses two opposed springs to provide the shock absorbing capability. Wilson does not consider the turning forces imposed on the shock absorber system nor does Wilson consider ease of assembly. The Wilson device uses the spring retaining system as the tongue load support which means that the retaining system could bend under tongue or imposed turning side loads thus jamming back and forth movement of the shock absorber. The reduction of back and forth movement will increase transmitted shocks between the two vehicles.

Wilson uses a total of four springs and incorporates a difficult assembly technique in that one set of springs must be installed, a nut screwed in place, a washer must be placed, another nut screwed in place, the second set of springs are then installed, and finally a final nut is added to hold the whole assembly together. Furthermore, the Wilson invention is designed for "hook and eye" trailer attachment and cannot easily be adapted to the modern "ball hitch" method.

U.S. Pat. No. 2,585,768 (Ham) discloses a Shock Absorbing Tow Bar which uses a single opposed spring and a regular shock absorber (i.e. filled cylinder) as his shock absorbing device. The Ham disclosure is similar to the Wilson disclosure in that the tongue and side loads are carried by the spring retaining tube. The Ham device is a complex mechanical design in that the number of components required to accomplish shock absorbing is excessive (approximately 7 elements and one spring—not including nuts). The Ham device does not consider adjustment of the damping coefficient by adjustment of spring tension in that the device uses a single spring acting in fixed compression.

U.S. Pat. No. 1,447,146 (Novk) discloses "A Coupling" and it is apparent from the drawings that the coupling is intended for use in the railroad industry. The one object of this invention is to provide a turning moment about the coupling so that railroad cars would not bind about the coupling axis when moving through a turn. A second object was to provide shock absorption when coupling or stopping but not while pulling. The invention uses a telescoping square tubular arrangement but the spring shock absorber in this coupling only acts in one direction and thus will not act to damp shocks transmitted between the two cars. Finally the invention does not allow for adjustment of the spring tension to change the damping coefficient.

U.S. Pat. No. 2,729,467 (Reese) and U.S. Pat. No. 2,709,604 (Hartman) disclose a method to transfer part of the trailer tongue load to the front end of the towing vehicle. Both of these inventions use springs, but the object of these springs is purely to transfer tongue load to the front end of the towing vehicle and to reduce the shock associated with the transferred tongue load. No adjustment of damping coefficient is provided.

Advertisements published in many magazines claim that a folding tow coupler, patent pending, is generally available to the motoring public. The advertisements shown that this coupler does not provide for any shock damping between the two vehicles. Thus the coupler will be subject to metal fatigue at the vehicle attachment points and will impart road shock between the vehicles. The device does provide a simple folding mechanism which is easily manufactured and maintained.

There remains a need for a tow coupler shock absorber system that will properly damp shock forces which are transmitted between two vehicles when used on conventional non-folding tow couplers. There also lingers a need for a folding tow couple system that includes a shock absorber. Such a device will improve the safety and comfort of the user.

SUMMARY OF THE INVENTION

An object of the present invention is to reduce the shock transferred between the two vehicles involved in a towing operation and to improve the simple folding tow coupler disclosed in public literature by adding a shock absorber which will fit it. These and other features will become apparent from the description of this invention, particularly when taken with the appended drawings.

The present invention resolves all the limitations of past devices when applied to towing vehicles on the modern highway in that:

a) the device ensures that shock absorption occurs while the two vehicles are following a straight line path or rounding a corner;

b) the invention provides for easily adjustable damping coefficients which allows the manufacturer to manufacture one such device to fit all sized loads thus saving the consumer money;

c) the invention is much easier to manufacturer and thus will save the consumer money; and, d) the device is simple and easy to maintain.

Finally the improved folding tow coupler offers an apparatus that continues to fold and stow easily but includes the addition of a shock absorber that does not interfere with the folding operation.

In general the shock absorber is a telescoping device centered about two steel springs. The steel springs provide a "pull-push" shock absorbing arrangement. The "pull" spring, which is totally encased in the telescoping device absorbs shocks that pull against the towing vehicle. The "push" spring, which is outside the telescoping arrangement, absorbs shocks that push against the towing vehicle. A telescoping mounting arrangement is used so that side loads, which are imposed on a tow coupler when the vehicles are turning, are properly transferred and contained. Two telescoping square tubes are preferred because a square hollow structure will resist bending moments with less material.

The shock absorber can be supplied in a number of slightly different versions that allow for varied use. There are two fundamental methods of towing a vehicle:

1) The standard single tow bar—similar to that found on a trailer, and 2) the conventional triangular tow coupler that is used to trail a vehicle such as car.

The shock absorber comes with a conventional trailer hitch for attachment to the "ball" of a towing vehicle. For a standard trailer the device is used in place of the standard non-shock absorbing hitch. In this case the device could be directly welded to a trailer tow bar. One version of the device has a mounting plate, complete with openings, welded to the device which allows the shock absorber to be bolted to the trailer bar in place of the standard hitch assembly.

In the case of a triangular tow coupler, the shock absorber device is supplied with a mounting plate that includes series of slotted openings to allow the device to be bolted directly to the triangular tow coupler. The use of folding tow couplers is becoming increasingly common, and one embodiment of the invention provides an improved folding tow coupler with modifications that accommodate the addition of the shock absorber of the invention. In the improved folding coupler the shock absorber mounting plate is designed so that the shock absorber may be pivotally connected to the side bars of the coupler, and the connection of one of the side bars to the base of the folding coupler has been modified to increase the distance between the side bars with the coupler in a collapsed configuration so as to accommodate the shock absorber of the invention. The improvements cooperate with the original design of the commercially available coupler so that once the tow coupler is collapsed the shock absorber extends between the two side bars of the triangular tow coupler. Thus the improvement to the commercially available tow coupler continues to allow for ease of storage (or folding) and provides previously unavailable shock absorption.

BRIEF DESCRIPTION OF DRAWINGS

FIG. 2C is a plan view of the shock absorber of this invention welded to a rectangular trailer bar.

FIG. 2E and FIG. 2F shows an alternate method to attach the shock absorber to a rectangular trailer bar.

DESCRIPTION OF PREFERRED EMBODIMENTS

Figure 1:
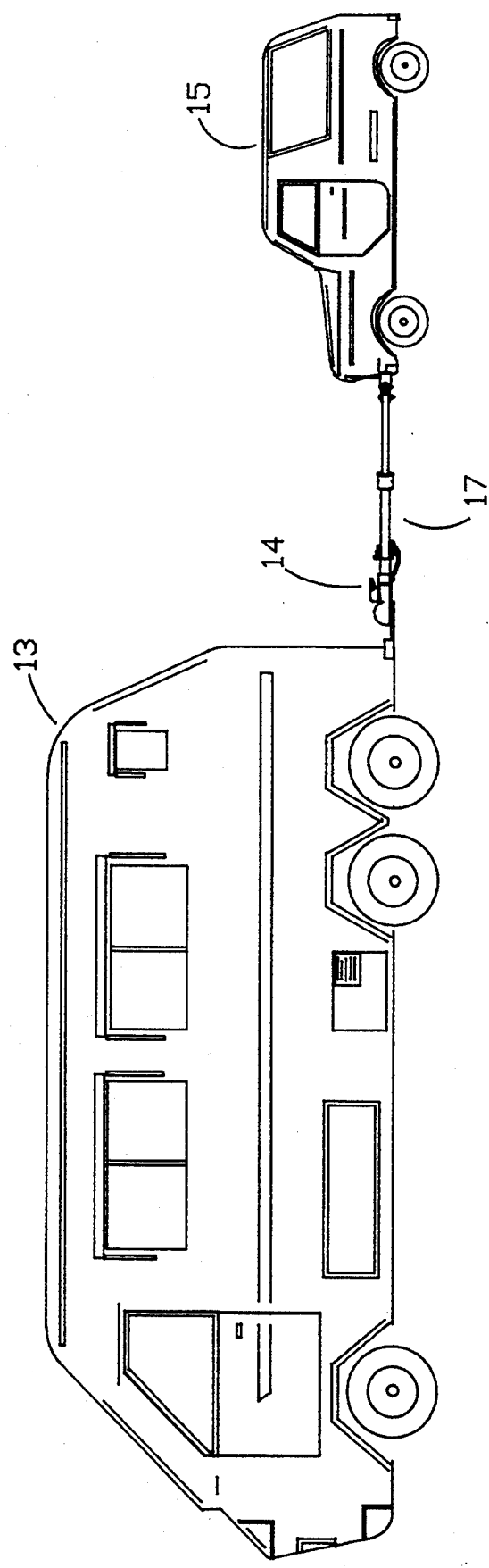
FIG. 1 is an elevational view of a towing and towed vehicle, showing the shock absorbing tow coupler in place between the two vehicles.

Referring to the Figures and in particular to FIG. 1, the towing vehicle, 13, is a mobile home or the like and the towed vehicle, 15, is an automobile, trailer, or the like. The towing vehicle, 13, as illustrated, may be self-powered or maybe another towed vehicle such as the tandem trailer arrangements currently found on the highway. The towed vehicle nay be simply a trailer, or a horse or livestock trailer; as illustrated, it is a four-wheel vehicle. The shock absorber device is shown generally as item 14. The triangular towing structure (folding or non-folding) is shown generally as item 17. The triangular towing structure is used when towing another motorized vehicle to force the towed vehicle to follow the towing vehicle in a turn.

A towed vehicle, which does not have a front rotational axis, will impart a side load when following a towing vehicle in a turn. This is due to the fact that there is no turning pivot point about which the front wheels can turn; therefore, the towing vehicle must impart a force to the trailing vehicle that causes the towed vehicle to track the towing vehicle. In a constant radius turn, the side load will oppose the direction of turn. Thus referring to FIG. 13B, where the two vehicles are in a constant right-hand turn, the side load will be towards the left and would tend to bend a tow bar that did not allow pivoting action about the hitch in line with the towed vehicle.

Figure 13C:
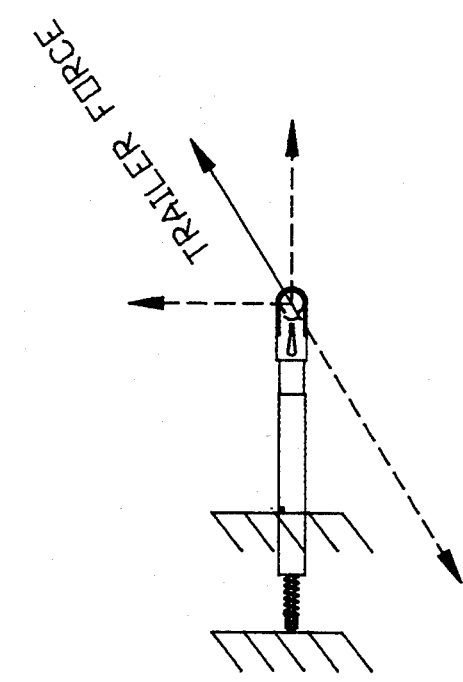
FIGS. 13A, 13B, 13C and 13D describe the towing and turning forces imparted to and from the tow coupler and attempt to show how the forces act back and forth through the shock absorber mechanism.
Figure 13D:
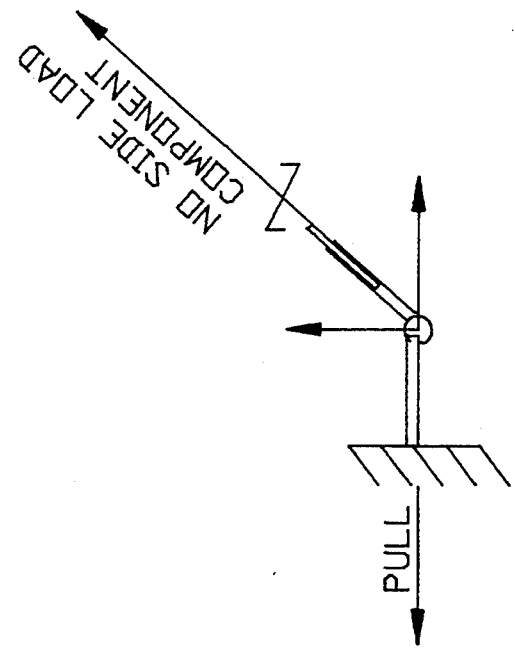
Figure 13A:
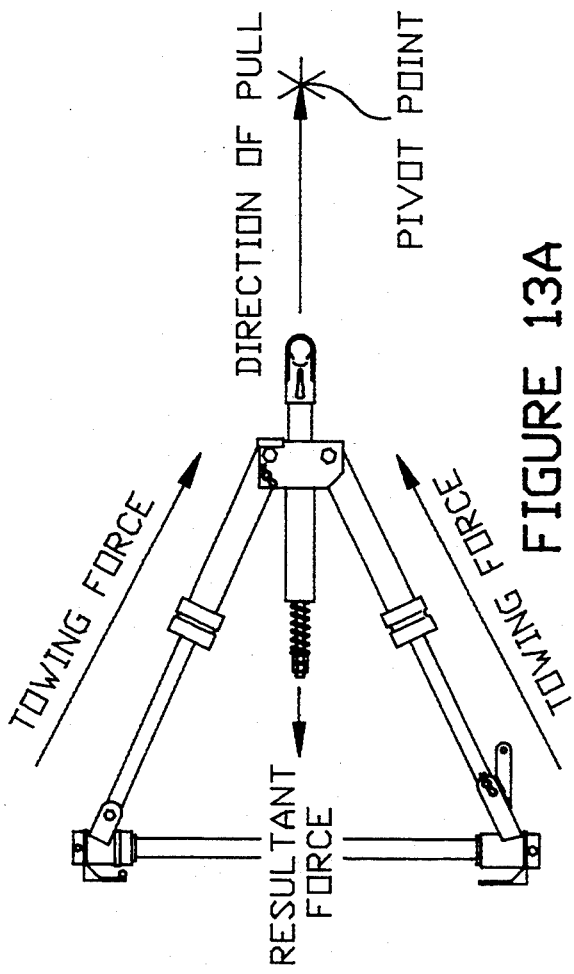
Figure 13B:
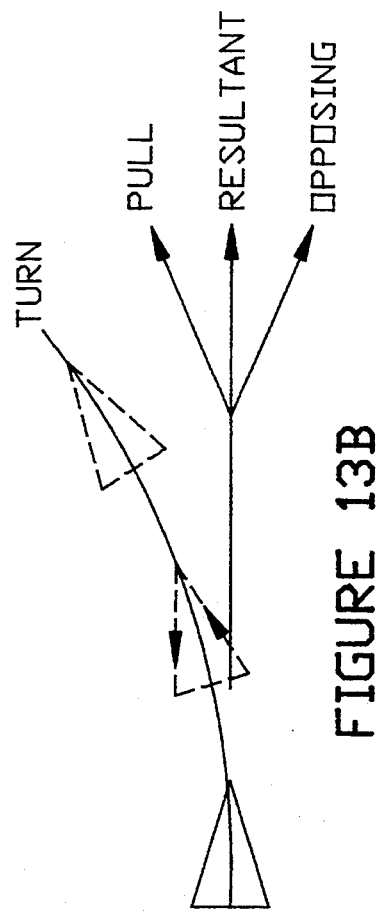

A shock absorber system rigidly mounted to the towing vehicle such as that originally disclosed in U.S. Pat. No. 4,258,930 (Hess) is shown in FIG. 13C for the purposes of comparison. The pivotal drag force imposed by the trailer load about the FIG. 13C hitch would have two components; an "X" and a "Y" component. The "X" component would be the pulling force imposed in line with the vehicle and the "Y" component would the side load imposed on the Hess telescoping bar. This side load would move the telescoping bar into the side of the retaining bar and reduce the shock absorbing capability of the Hess device.

The instant invention does not have the shock absorbing apparatus mounted to the towing vehicle, but rather has that apparatus mounted on the tow coupler. The trailer drag force thus does not have an "X" nor a "Y" component, but always acts radially in line with the shock absorber device. Thus the side load cannot shift the telescoping bar into the side of its retaining bar and reduce the shock absorbing capability of the invention. While there is still an "X" and "Y" component imposed on the towing vehicle hitch, these force components do not affect the efficiency of the shock absorber.

Three uses of the shock absorber are illustrated in FIGS. 2. FIG. 2A, which illustrates the first use in which the tow coupler 17A is a noncollapsible folding geometric figure in the shape of an isosceles triangle. The tow coupler 17A, shown in plane view, is shaped as an isosceles triangle so as to transmit the towing and turning forces on the two equal sides, 26 and 27. The tow coupler includes a first hitch means, 19, the shock absorbing apparatus, 21; and two second hitch means, 22 and 23, mounted to a spreader bar, 24, which in turn is attached to the towed vehicle. Note that the two second hitch means, 22 and 23, are somewhat complicated and made up from a number of subassemblies. An explanation of these subassemblies and their interactions will follow shortly.

Figure 2A:
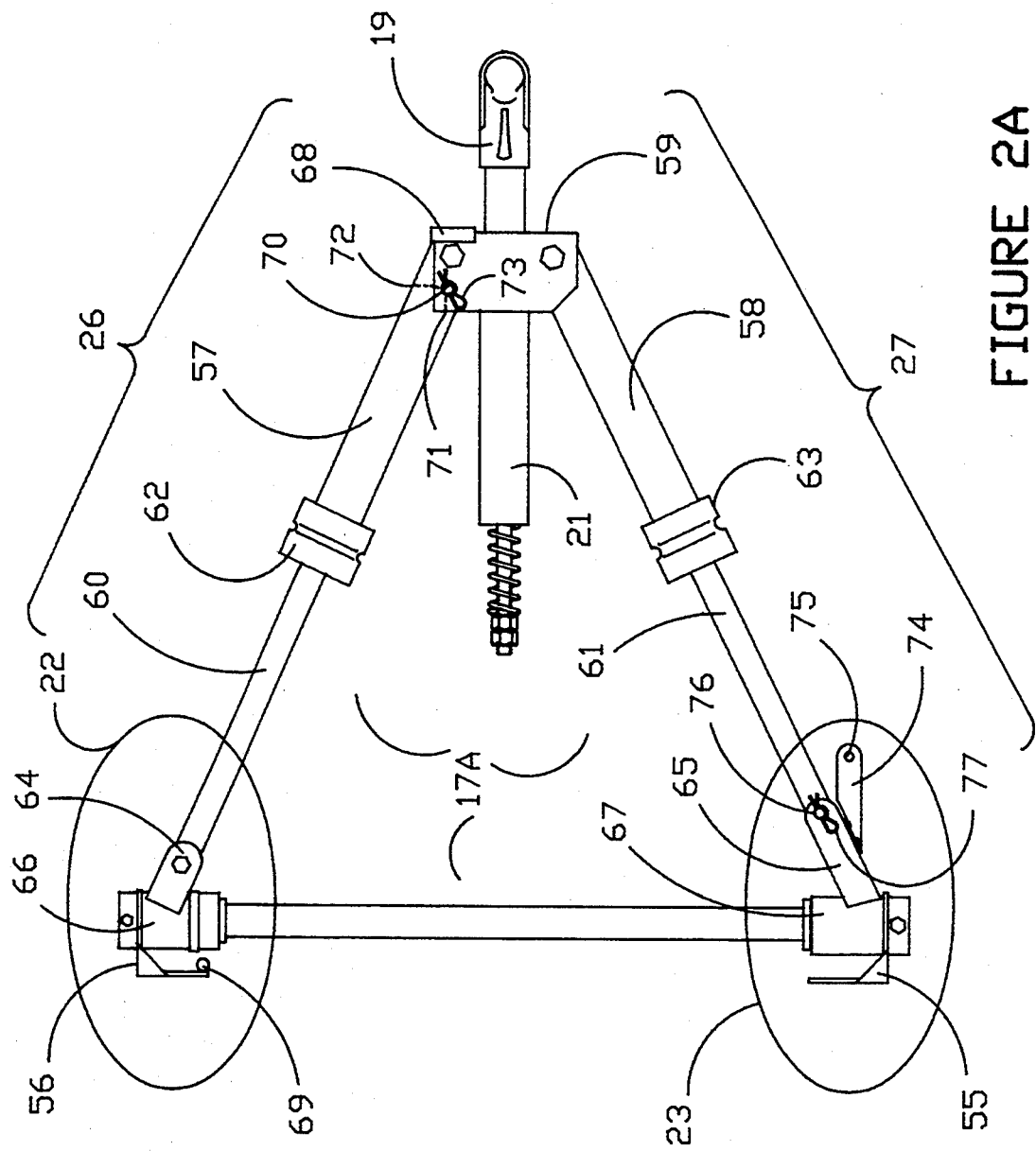
FIG. 2A is a plan view of the shock absorber of this invention interposed on the folding tow coupler.
Figure 2B:
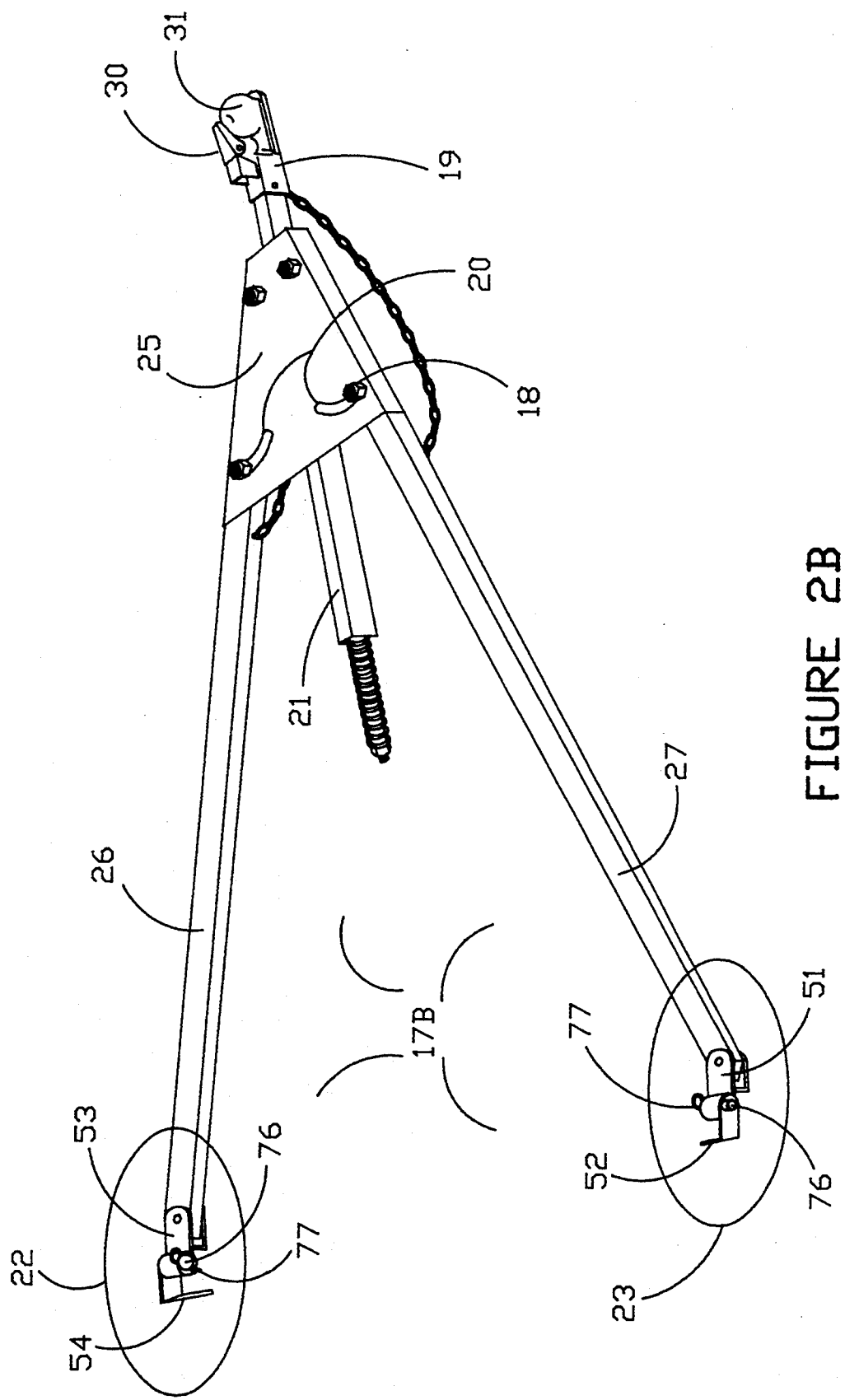
FIG. 2B is a plan view of the shock absorber of this invention interposed on a non-folding or regular triangular tow coupler.
Figure 2F:
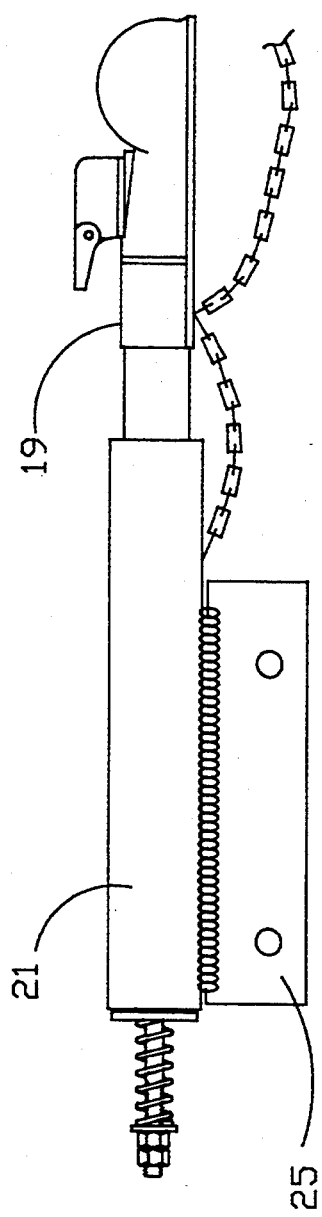

FIG. 2B, which illustrates the second use, where the tow coupler 17B is a noncollapsible non-folding geometric figure. Once again the tow coupler 17B is an isosceles triangle so as to transmit the towing and turning forces along the equal sides. The tow coupler includes a first hitch means, 19, the shock absorbing apparatus, 21; and two second hitch means, 22 and 23. These second hitch means are considerably simpler than the folding coupler, 17A, and consist of two mounting brackets, 52 and 54, two retaining pins, 76, two retaining clips, 77, and side bar brackets, 51 and 53. The side bar brackets, 51 and 53, are bolted to the right and left side bars (the equal sides of the triangle) respectively. The mounting brackets, 52 and 54, are attached to the right and left side of the vehicle to be towed. The tow bar coupler is then held in place by retaining pins, 76, and retaining clips, 77.

Figure 2D:
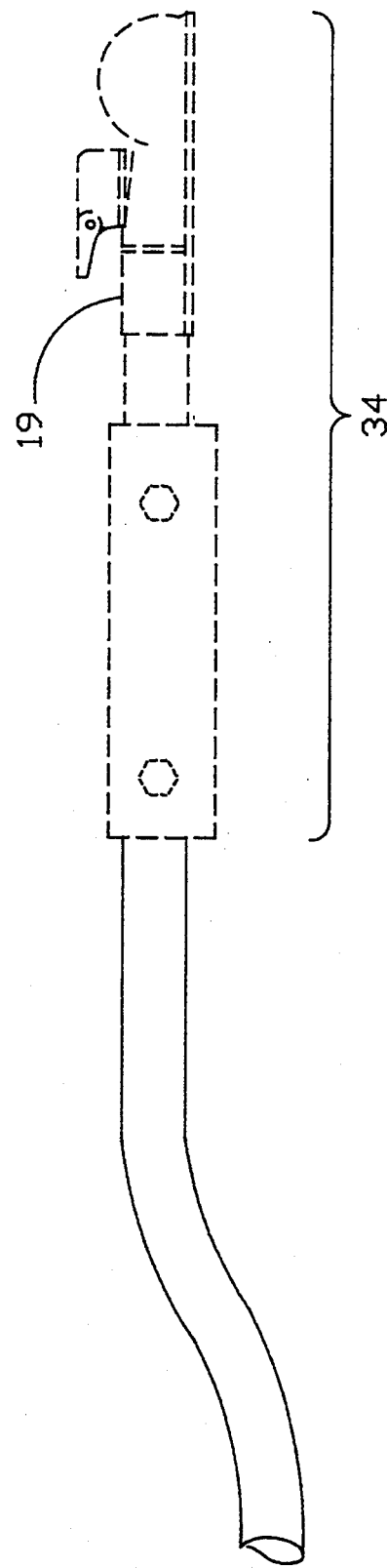
FIG. 2D is an illustration of the shock absorber of this invention attached to a round trailer bar.
Figure 3:
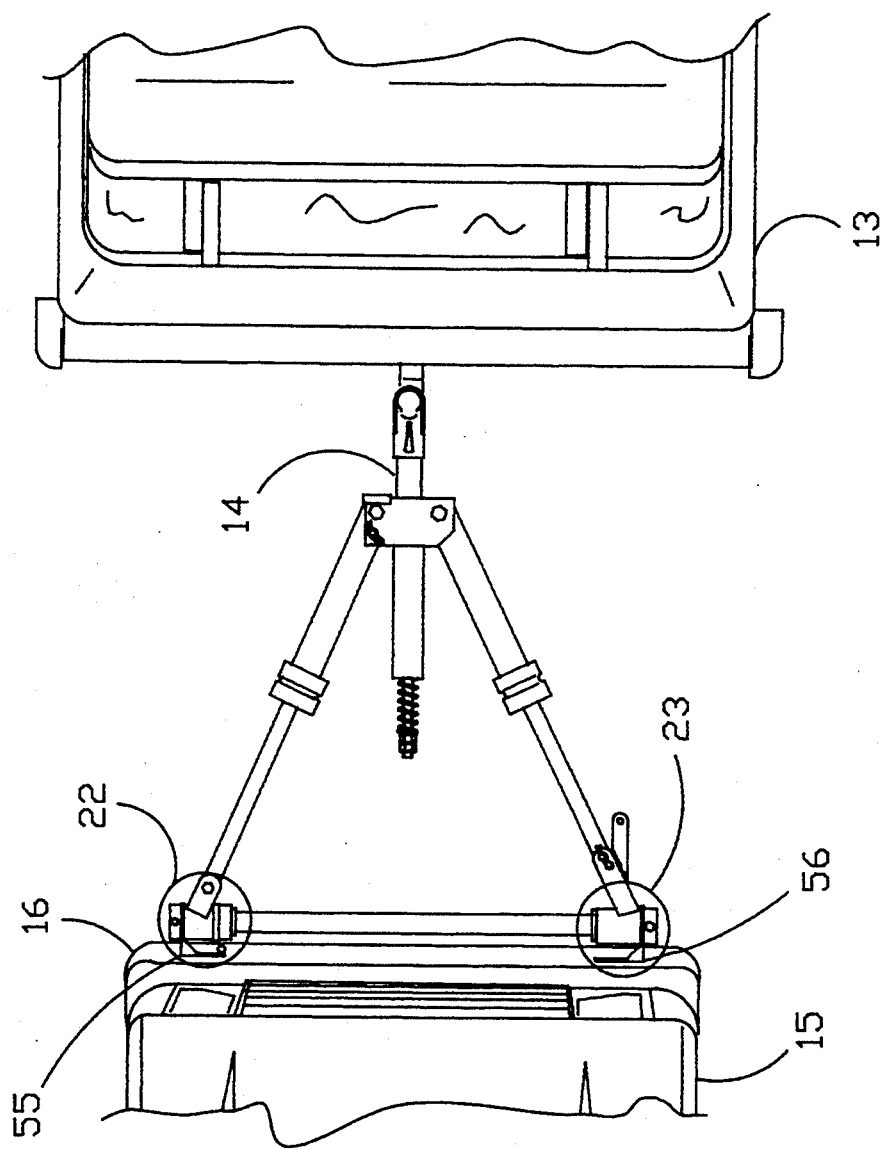
FIG. 3 is a plan view of the tow coupler of this invention interposed on the folding coupler and between a towing vehicle and a towed vehicle.

FIG. 2C, which is an elevational view, illustrates a third possible use where the tow coupler is a standard rectangular trailer bar, 17C. The tow coupler includes a first hitch means, 19, and the shock absorbing apparatus, 21. In this illustration the shock absorbing apparatus is welded to the standard trailer coupler 35 but the apparatus could easily be bolted to the trailer coupler using ears 36 bolted to both the shock absorbing apparatus and the trailer coupler 35 as shown in the insert to FIG. 2E. FIG. 2D illustrates an alternate use of the shock absorbing device in use with a round trailer bar. Note how the original hitch, 34 would be removed from the bar and the shock absorbing device, 21 bolted in its place.

Figure 4:
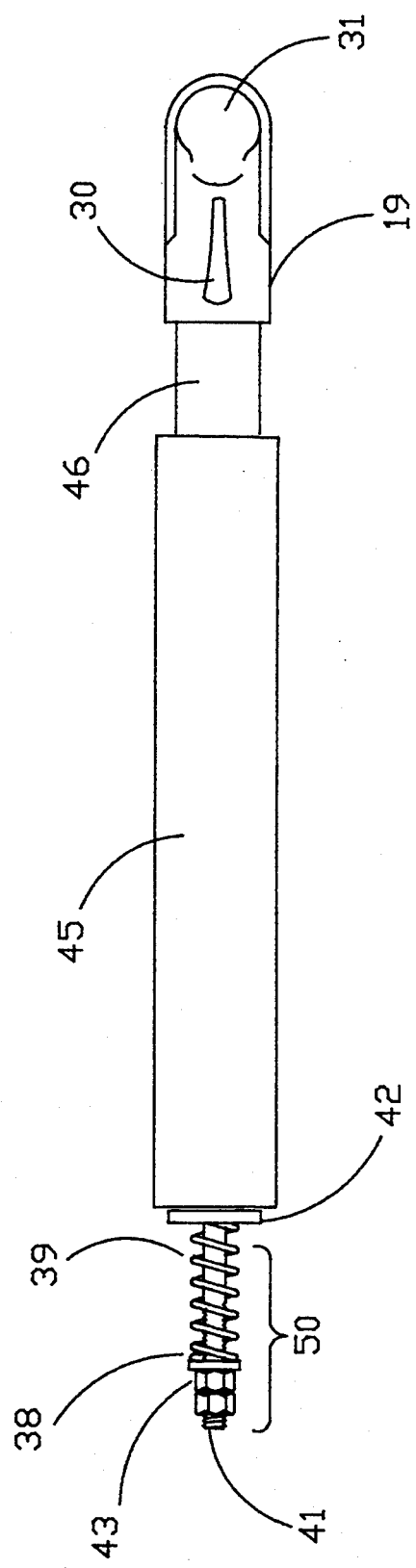
FIG. 4 is a partial side elevation view of the shock absorber tow coupler of FIG. 2A with the folding tow bar removed for clarity.
Figure 5A:
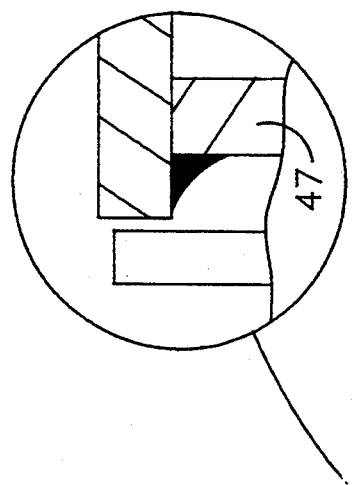
FIG. 5A is an enlarged view of the circular section shown in FIG. 5.
Figure 5:
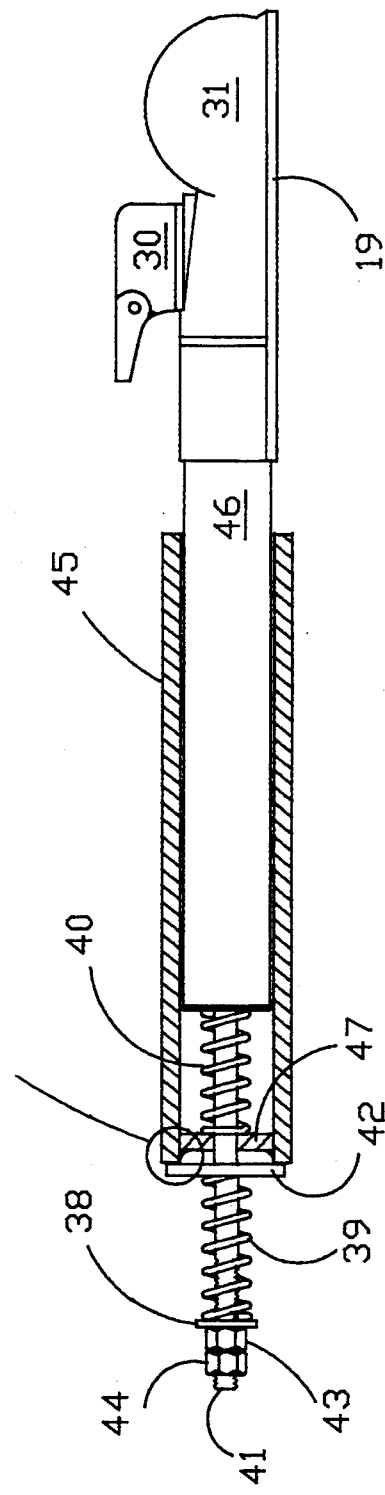
FIG. 5 is a sectional plan view of the tow coupler of FIG. 4.
Figure 6:
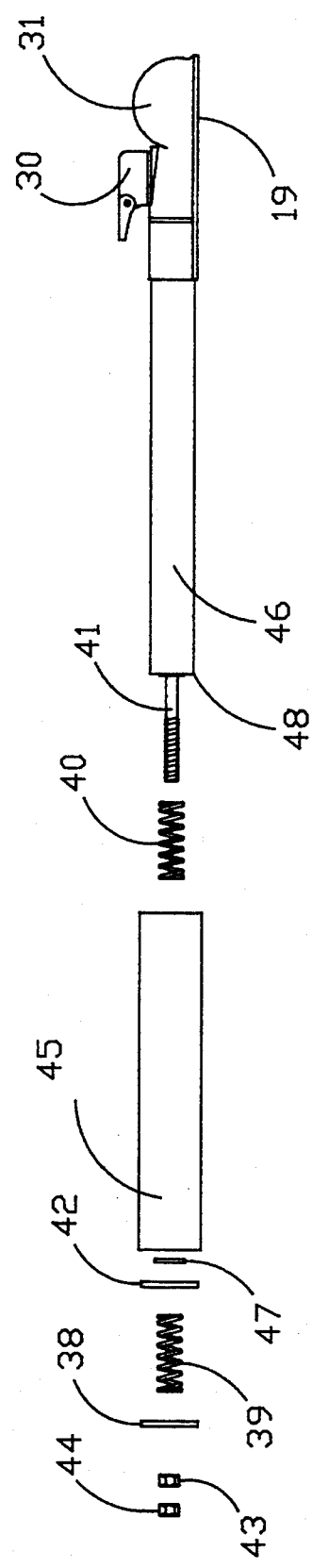
FIG. 6 is an exploded view of the tow coupler of FIG. 4 with the elements shown in detail.

As illustrated, these three versions of the tow coupler 17 include a pair of tubular members which form the basis of the shock absorbing device. Referring to FIGS. 4 through 6, the telescoping shock absorbing apparatus includes a pair of square tubes with a rod disposed interiorly in one of the tubes and axially thereof for transmitting the towing force. A pair of springs, 39 and 40, are disposed adjacent and connected on the members for absorbing shock. Specifically, the springs absorb the force of any road hazards that would otherwise be transmitted between the two vehicles so that the towing vehicle experiences hardly any shock through the connection to a towed vehicle, which substantially improves the operating conditions of both vehicles.

Square tubing, 45 and 46, may be employed for the apparatus, 21 and is the preferred embodiment. Square tubing will resist bending moments much better than round tubing. Thus the light tongue and side loads will cause less deflection in the apparatus and result in less drag within the telescoping members. Outer member, 45, is used to telescopingly receive an inner member, 46. As shown, the outer member, 45, may be formed of 2-inch by 2-inch by 3/16ths-inch steel tubing and the inner member may be 1 1/2-inch by 1 1/2-inch by 3/16ths-inch steel tubing. The outer member, 45, has a welded cap, 47, that is about ¼ inch thick and whose material is similar to that of the square tubular member. The welded cap, 47, has a 1 inch hole in the center for receiving the central bolt extension, 41, of the inner telescoping member, 46, and acts to retain the springs, 39 and 40, in place against the welded cap, 47.

The member, 41, is preferably formed from a central bolt which may be ⅜ inch by 10 inches in length and may be affixed, by welding (shown as bead 48) the central bolt head, 49, to the telescoping first member, 46, for movement within the second member, 45, which is telescopingly mounted with respect to the outer member. It is material whether the central bolt head, 49, is welded to the inner member, 46, or simply passed through a hole in the wall of to the inner member. It is much easier to construct the apparatus if the central bolt head is welded to the inner member and, as will be explained, it will be much easier to adjust the spring damping coefficients. The inner spring, 40, is placed over the central bolt, 41, between the central bolt head, 49, butting against the inner member, 46, and the weld, 48; and the inside of the wall, 47. The inner spring absorbs any shock force due to deceleration, or to road conditions that force the two vehicles toward each other, during the tow of the towed vehicle.

The outer spring, 39, is disposed about the central bolt, 41, and between the retaining nut, 43, SAE washer, 38, and the outside of the wall, 47. Outer spring, 39, absorbs any shock force that may be due to acceleration or road conditions that force the two vehicles away from each other. In this way, the shock due to forces acting in either direction along the line of travel is taken by the springs. It is imperative that the springs have sufficient rigidity so that they absorb the shock completely, yet they must allow sufficient room, three inches or more of axial movement, for the towing and turning force to be transmitted from the towing vehicle to the towed vehicle without fully compressing the springs.

The springs are substantially equal both in length and in the amount of force that is takes to compress a given axial distance. For example, one embodiment uses 4 inch springs that have a compressive force of approximately 560 pounds-force per inch. The diameter of these springs would be about 1.5 inches so that they fit around the central bolt without binding. The protruding assembly (length 50) will be approximately 5 inches. If desired, washer, 42, can be employed, although it has not been found necessary in the embodiments to date.

The first, or inner, telescoping member, 46, may be a solid bar although, in this embodiment, a tubular construction is desirable. It is well known that any hollow tubular structure will have more resistance to bending moments than a solid structure with an equivalent volume of material. As will be apparent, the first member, 46, is affixed so as it slides axially interiorly of the second member, 45, which is also tubing of square cross axial shape in the illustrated embodiment.

Figure 7:
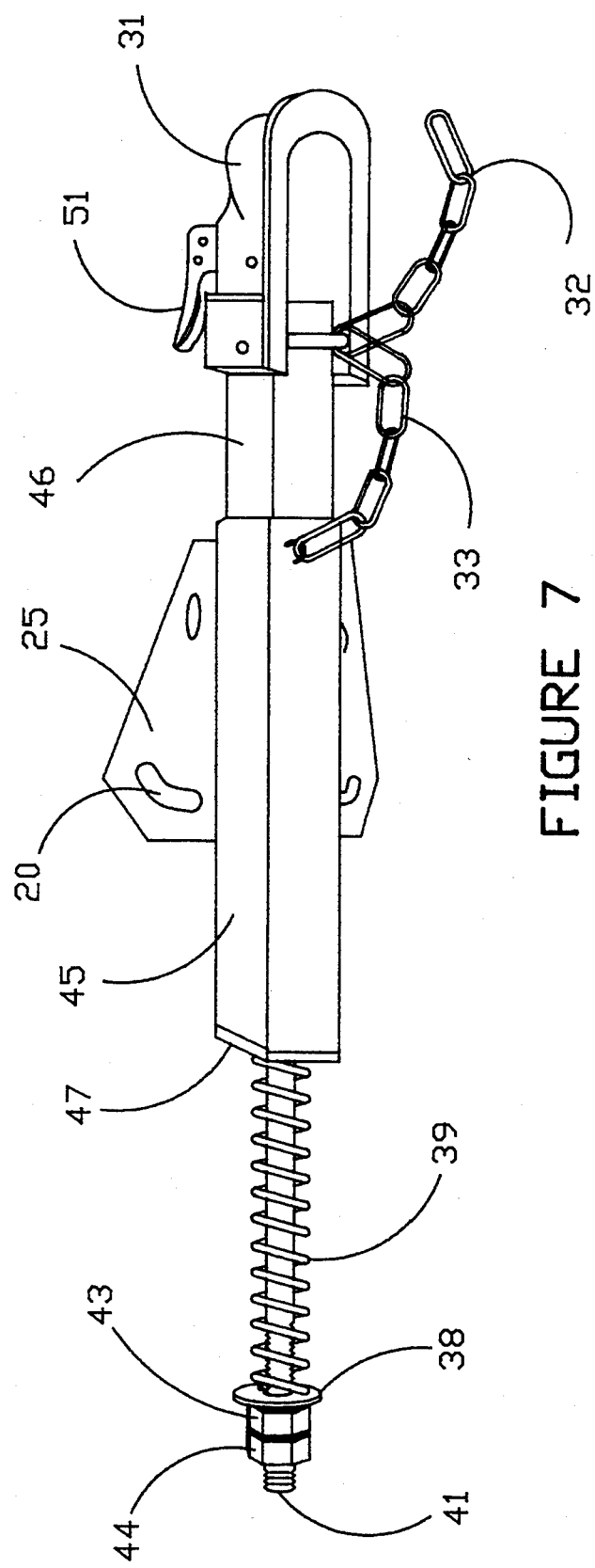
FIG. 7 is a partial isometric view of the front portion of the tow coupler of this invention.
Figure 8:
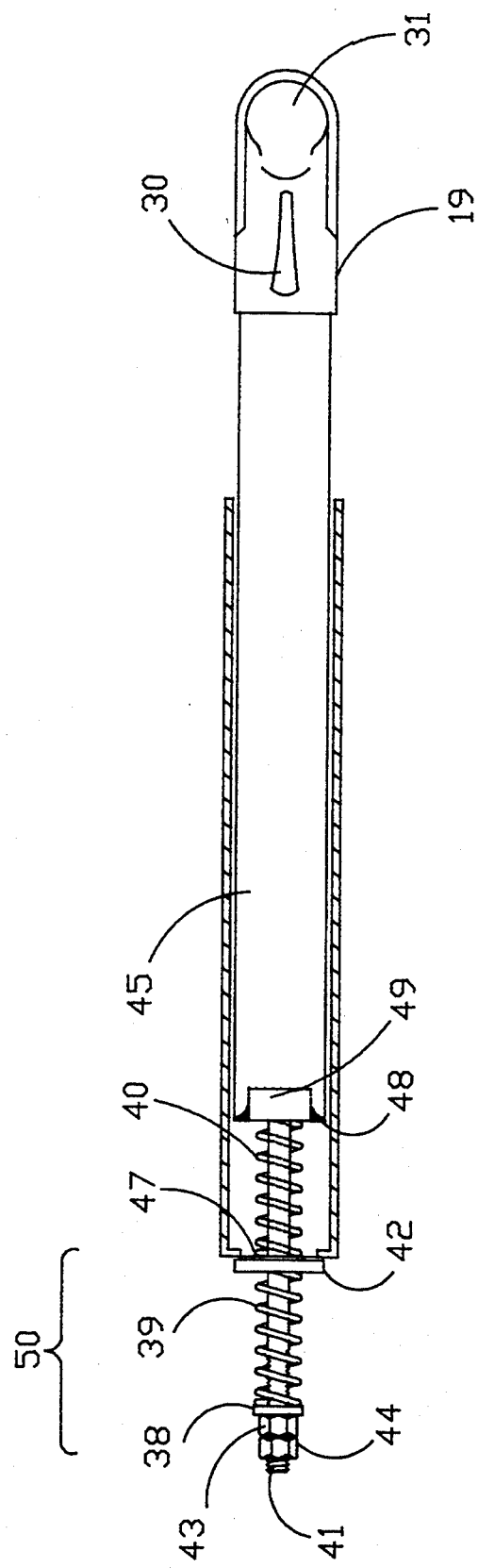
FIG. 8 is a plan view of the shock absorber hitch showing mounting tabs for use on both a folding and non-folding triangular towing coupler.
Figure 9:
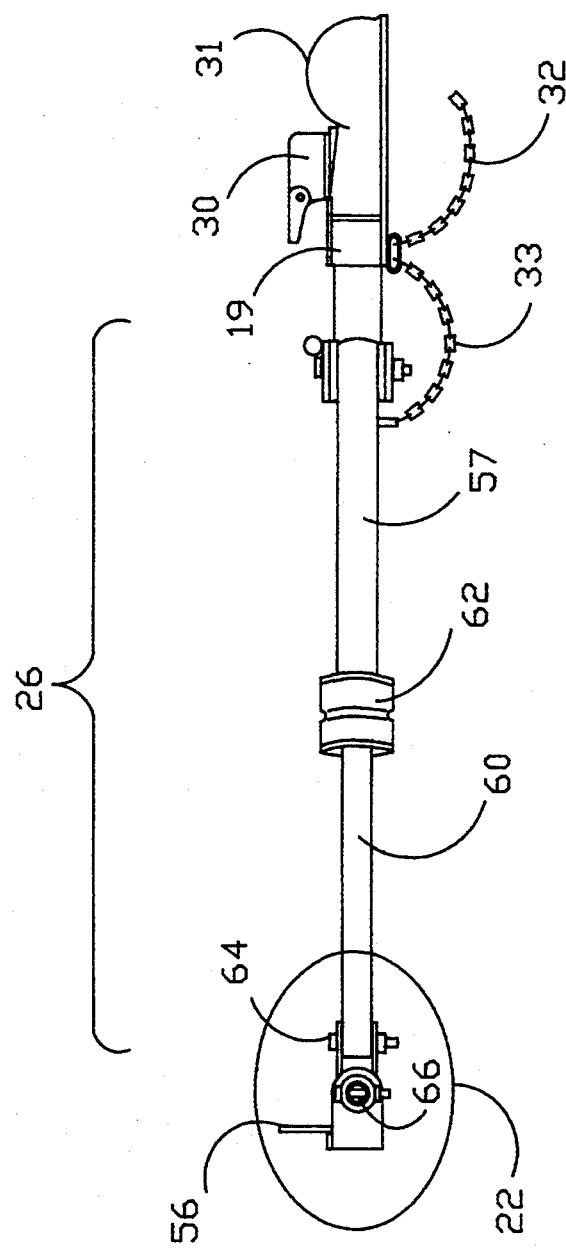
FIG. 9 is a plan view of the shock absorber as installed on the folding coupler.

Once the apparatus is assembled, as illustrated in FIG. 2C or FIG. 7, a safety chain, 33, can be affixed between the first, or inner, portion, 46, and the second, or outer, portion, 45. Of course, the safety chain, 33, can be continued to form a conventional safety chain, 32, across the trailer hitch to eliminate any chance of inadvertent disconnection of the trailer hitch.

The shock absorbing apparatus described above is designed for light trailer tongue loads and will operate very well when used in conjunction with a tow bar used between a towed vehicle and a prime mover. The use of a tow bar generally assures that no tongue load is being carried by the trailer hitch on either the tow bar or the prime mover: there is no gravity component to cause the telescoping pieces, 45 and 46, to bind against each other. When the shock absorber is used in conjunction with a standard trailer bar then some of the trailer weight can be transferred to the trailer hitch and through the shock absorber apparatus. Thus, with the possibility of a gravity component, the device could bind and not work efficiently. The inventor has thought of this possibility and the device can be modified to carry medium or heavy trailer loads. The inventor has even designed a shock absorber system for extremely light tongue loads.

It should be noted that the length of the telescoping members is somewhat critical in being able to transfer gravity and turning forces. For example in the prior art, the telescoping members are very short and any side load could easily bind the the inner member within the outer member: in fact, most prior art will easily bind whenever a gravity component is placed on that particular apparatus. The instant invention reduces this possibility by adding extra length to the members. Furthermore the extra length allows for proper placement of bearings or bearing surfaces to deal with gravity or side loads; a feature not provided for in the prior art.

Figure 11A:
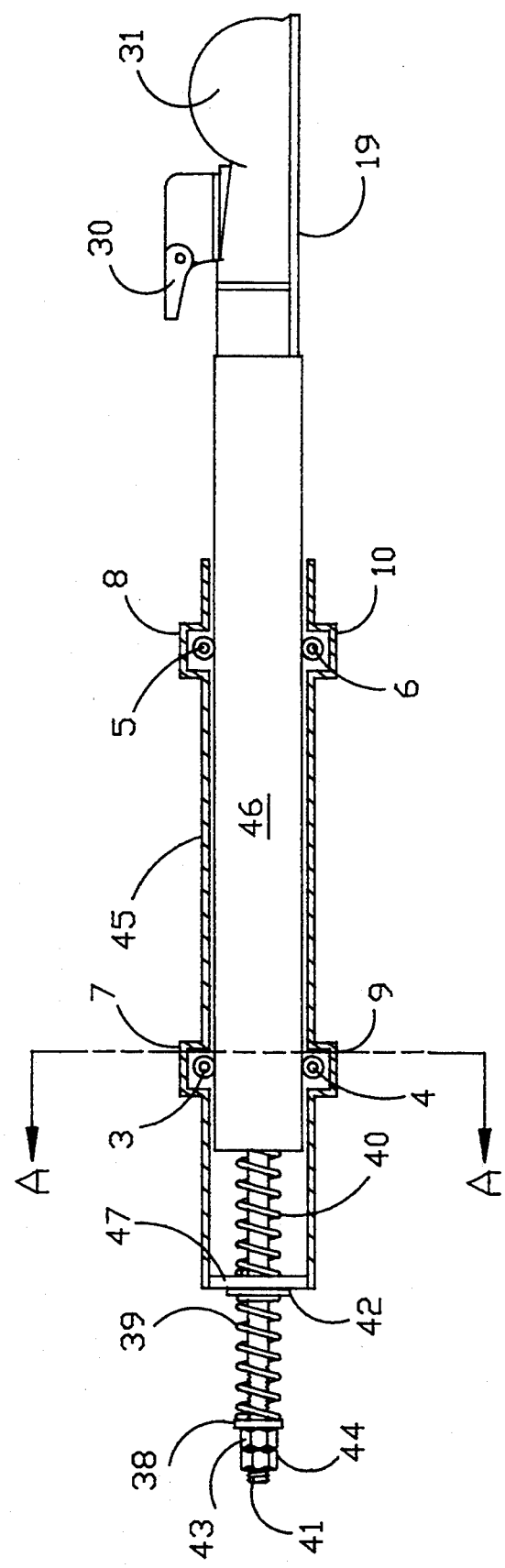
FIG. 11A is an alternate embodiment of the shock absorber device for high tongue loads showing bearing surfaces.
Figure 11B:
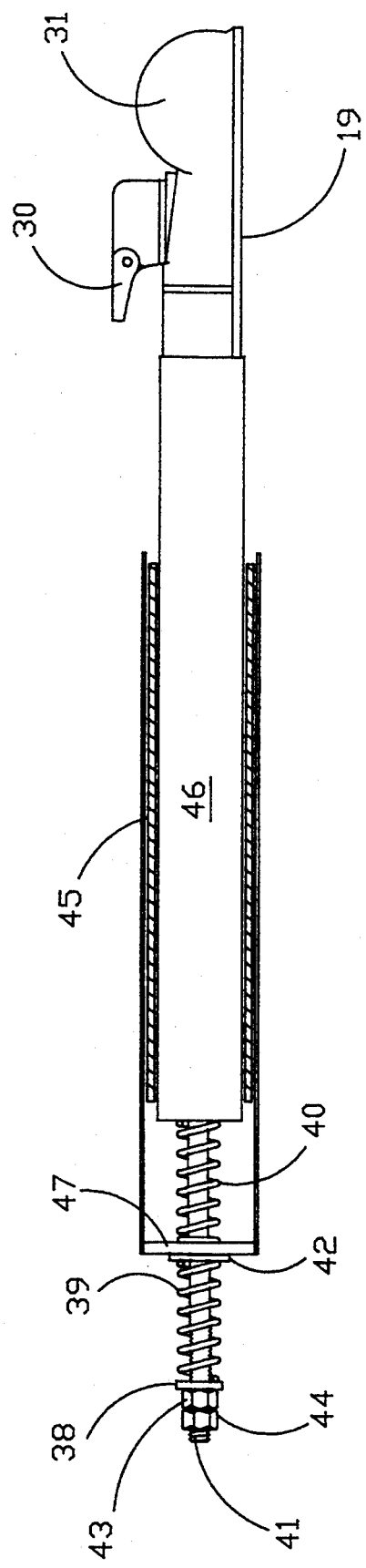
FIG. 11B is an alternate embodiment of the shock absorber device for extremely light tongue loads showing bearing surface.
Figure 12:
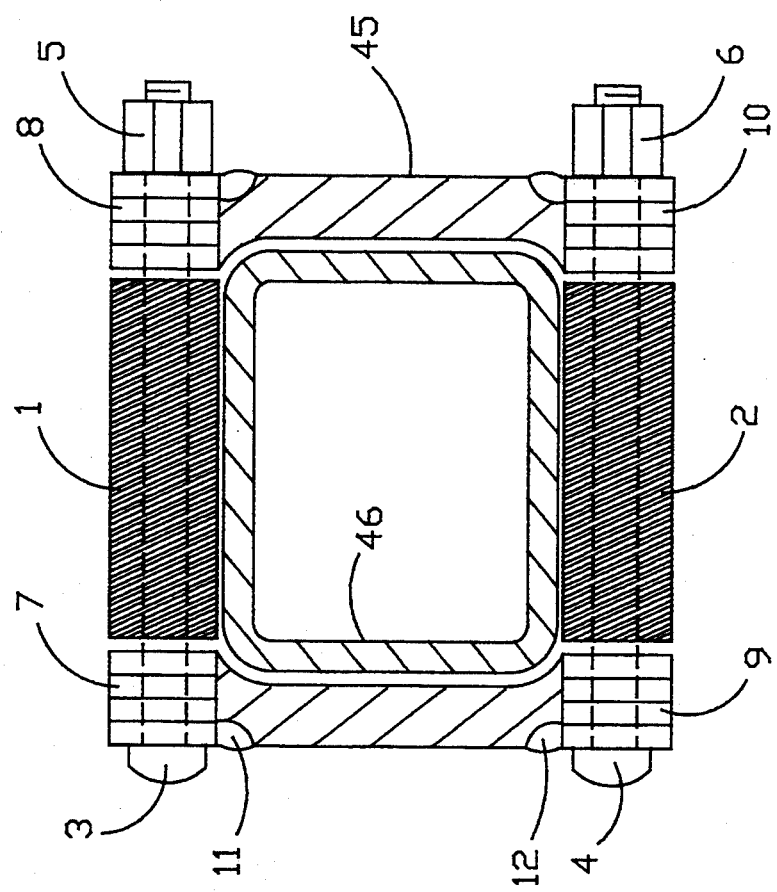
FIG. 12 is a plan view taken through a bearing surface (at AA) of the embodiment of FIG. 11A, illustrating the bearing mechanism.

The modification for trailer loads with a large gravity component is shown in FIGS. 11A, 11B and 12. In the light load shock absorber, a large gravity component could cause the inner telescoping member, 45, to bind against the outer telescoping member, 46, at top and bottom. Four sets of bearings have been added to the outer member (which truly serves as a housing), 46, to carry the gravity load imposed on the inner member by a gravity component. The bearings are mounted at the front of the outer member and slightly in front of the mid point of the outer member. Thus the inner member will glide back and forth on the bearings and acceleration and deceleration forces will be efficiently transferred to the appropriate springs, because there is no binding. Thus the shock absorbing characteristics will not be affected.

The bearings are mounted between bearing tabs, 7 and 8 and 9 and 10, which are welded in the appropriate positions on the outer member (beads 11 and 12). In addition, the horizontal portion of the outer member between the right, 8, and left, 7, tabs on top of the member and the right, 10, and left, 9, tabs on the bottom of the member is removed to expose the inner member, as illustrated in FIG. 12. The bearings, 1 and 2, are standard sleeve bearings :mounted on bolts 3 and 4 which are held in place by fixtures 5 and 6, which can be nuts, or rivets, or otherwise. It would be possible to use a hollow bolt and add a grease fitting so that the bearing could be lubricated. The number of bearings needed can depend on the magnitude of the gravity component and may be adjusted as needs require to include more or less bearings then described in the illustration given. The number of bearings, the method of mounting and the type of bearing (roller, sleeve, or the like) is considered to fall within the scope of this disclosure. The choice would be left to the manufacturer of the device.

For extremely light tongue loads, such as those experienced in a motor cycle trailer, a different approach must be taken. The shock absorber operates by transferring shock load to the springs contained within the device. If there is too much friction between the telescoping parts, then some shock will be transferred directly to the telescoping members and not be absorbed by the springs. FIG. 11B illustrates the type of telescoping apparatus that would be needed for extremely light loads such as those found in a motor cycle trailer. The shock absorber still has the same basic components described in the previous paragraphs, but the bearing surface is different. A rectangular bearing, 37, of low friction material such as Teflon ®, is placed inside the outer member, 45, and the inner member, 46, slides within and on the bearing surface. The bearing, 37, may be formed as a separate member interconnected to the outer member, 45, or it may be formed as a coating on the mating surfaces of either or both of the outer member, 45, or the inner member, 46.

In actual operation, the non-folding tow coupler is then affixed by bracket set 51 and 52, and by bracket set 53 and 54, to the towed vehicle so as to impart a steering force. The bumper brackets, 52 and 54, may be connected to the towed vehicle by any appropriate means, such as bolts and nuts or bumper clamps and left in place on the vehicle. The bracket sets readily disconnect by removing retaining clips 77 and retaining pins 76. These bracket sets form a part of the second hitch means, 22 and 23, and serve to impart any turning force delivered by the tow coupler 17B.

Figure 10:
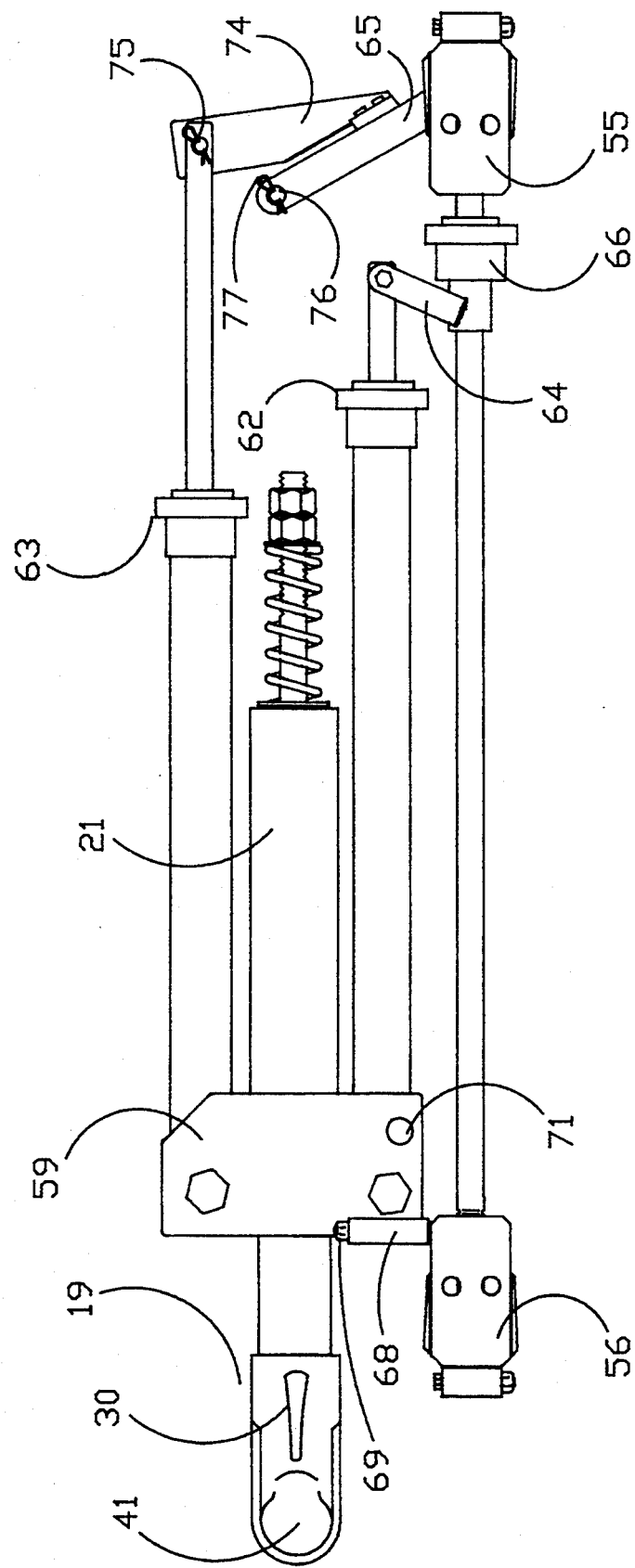
FIG. 10 is a is a plan view of the shock absorber as installed on a folded coupler, illustrating how the shock absorber mechanism does not interfere with the folding mechanism.

The shock absorber of the invention may, as noted above, be readily used in conjunction with a folding tow coupler, as illustrated in expanded configuration in FIG. 2A and in collapsed configuration in FIG. 10, with the inclusion of improvement modifications to the conventional folding tow coupler to accommodate the additional structure of the shock absorber. A conventional folding tow coupler, shown in expanded configuration in FIG. 14 and in collapsed configuration in FIG. 15, includes a spreader bar, 24, which forms the base of the triangular shape of the expanded coupler, a pair of side bars designated as 26 and 27, and a hitch means, 19. Mounting brackets 55 and 56, are attached to the spreader bar, 24, and used to permanently connect the folding tow coupler to a vehicle to be towed. Each of the side bars, 26 and 27, is formed as a telescoping structure, having hollow tubes 57 and 58, each pivotally interconnected at one end to a pivot plate, 59, and rods 60 and 61, partially disposed in the interior of tubes 57 and 58, respectively, and extending outwardly therefrom at the end opposite the connection of tubes 57 and 58 to the pivot plate, 59. Hitch means 19 is rigidly connected to and extends outwardly from pivot plate 59. The position of rods 60 and 61 relative to tubes 57 and 58 is controlled by locking collars 62 and 63. The ends of rods 60 and 61 extending outwardly from tubes 57 and 58 are pivotally interconnected to spreader bar 24 through tabs 64 and 65 and collars 66 and 67. Both collars 66 and 67 rotate around spreader bar 24, and collar 66 may be released and slid along spreader bar 24 toward collar 67.

Figure 14:
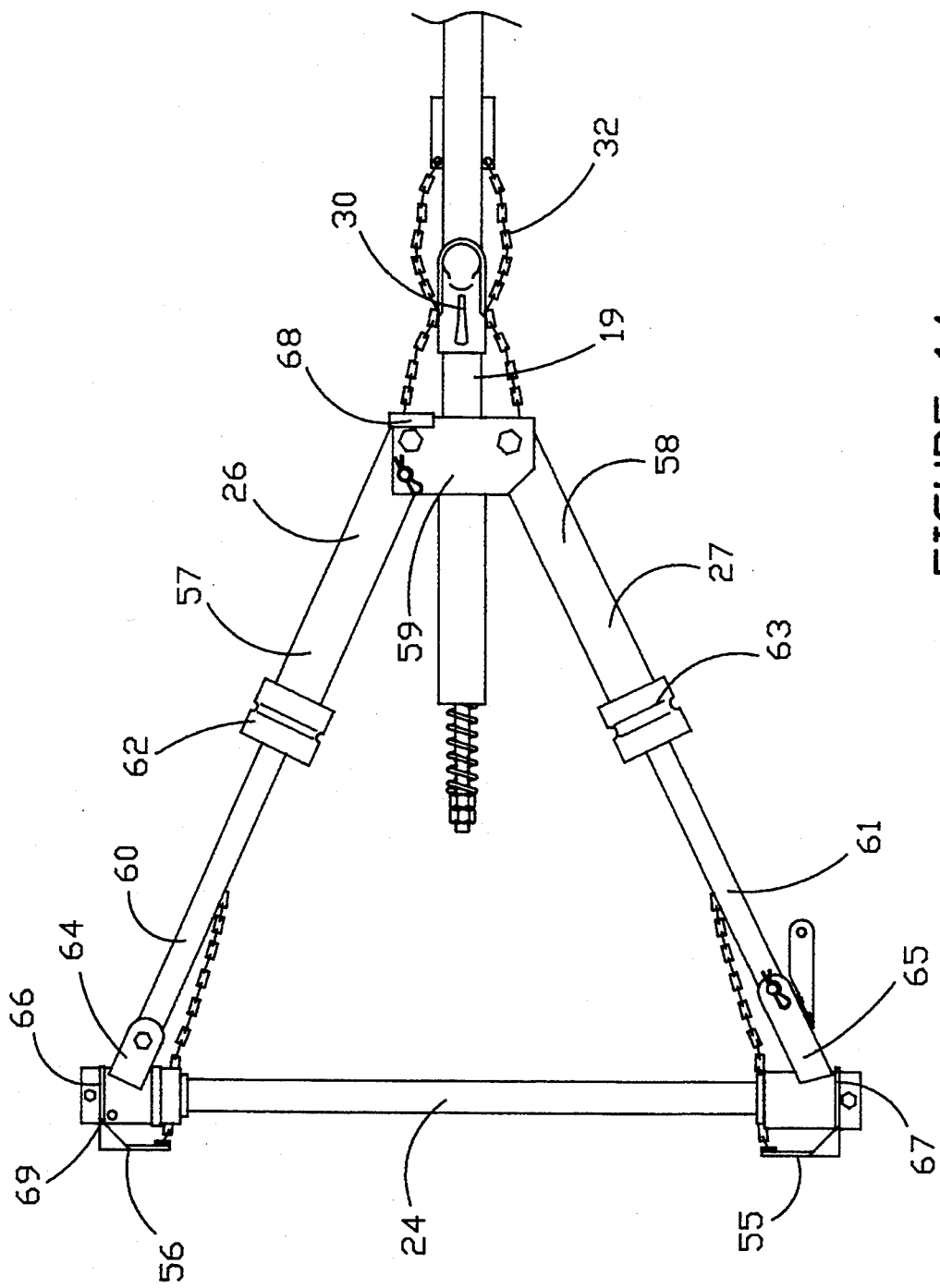
FIG. 14 is an isometric view of the unimproved folding tow coupler in its unfolded state and ready for towing a vehicle.
Figure 15:
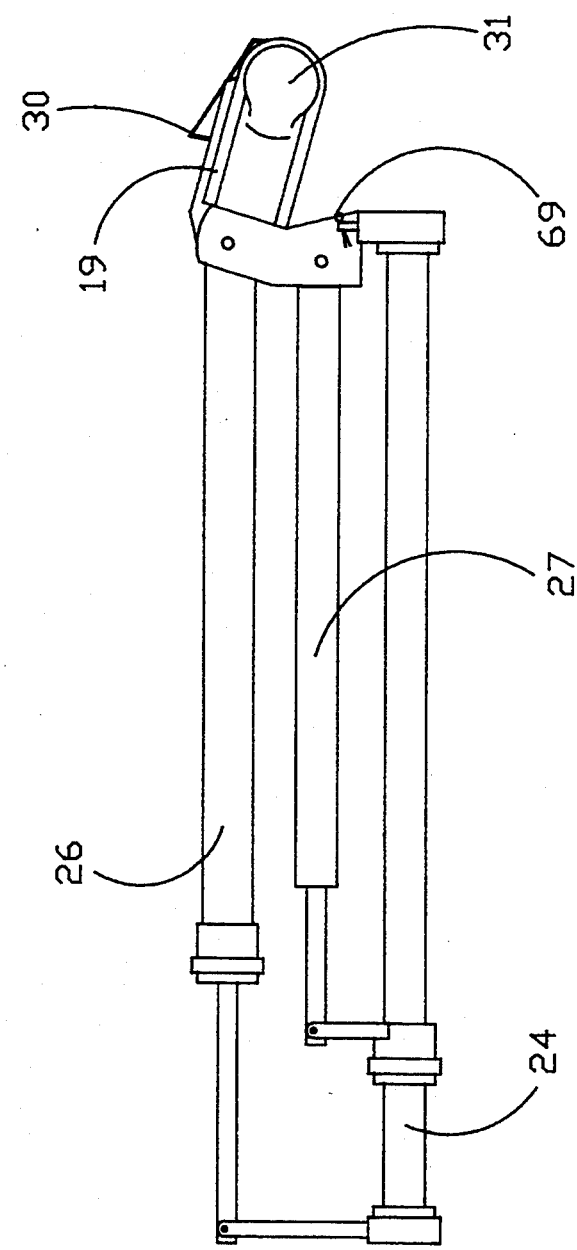
FIG. 15 is an isometric view of the unimproved folding tow coupler in its folded state.

When the conventional coupler 17D is to be folded from the expanded configuration of FIG. 14 to the collapsed configuration of FIG. 15, collar 66 is released from its locked position on spreader bar 24 and locking collars 62 and 63 are released to allow rods 60 and 61 to move relative to tubes 57 and 58. Collar 66 is slid along spreader bar 24 until it is adjacent to collar 67, bringing side bar 27 alongside and parallel to side bar 26, and side bars 26 and 27 are rotated about spreader bar 24 until they are disposed directly above spreader bar 24. Side bars 26 and 27 are then pivoted at their connections to tabs 64 and 65 until they are adjacent and parallel to bar 24, forming the collapsed configuration shown in FIG. 15. A retaining tube 68, connected to pivot plate 59, is received over a retaining pin 69 to retain and stabilize the tow coupler in the collapsed position.

As will be seen from FIG. 15, when the conventional folding tow coupler is collapsed, side bars 26 and 27 lie immediately adjacent to each other, leaving no room for shock absorber 21 between them. Therefore, the structure of the conventional folding coupler must be modified and improved to accommodate the shock absorber of the invention in the collapsed configuration. Referring now to FIG. 2A and FIG. 10, showing the improvement, pivot plate 59 is enlarged, and the shock absorber 21 of the invention is connected to pivot plate 59 between tubes 57 and 58, with hitch means 19 connected to shock absorber 21 as described above. A removable stabilizer pin 70 extends through an aperture 71 in pivot plate 59 and a matching aperture 72 in tube 57, to ensure the rigidity of the tow coupler in its expanded configuration. Pin 70 is releasably retained by retaining clip 73. An additional tab 74 is interconnected to tab 65 of the conventional coupler, and extends outwardly therefrom. Tab 74 is disposed such that its longitudinal axis is generally perpendicular to the longitudinal axis of spreader bar 24, and is provided with aperture 75 near its outer end. The permanent pivot connection between rod 61 and tab 65 is replaced by a removable pin 76, which is held in place by retaining dip 77.

The improved folding tow coupler is folded from the expanded configuration of FIG. 2A to the collapsed configuration of FIG. 10 by first releasing retaining clips 73 and 77 and withdrawing pins 70 and 76 from their respective apertures. Rod 61, which has been released from tab 65 by removal of pin 76, is repositioned with the pin aperture in its free end aligned with aperture 75 of tab 74 and pin 76 is extended through the aligned apertures and retained with dip 77. Pin 70 and retaining dip 73 may be conveniently stored in the pin aperture of tab 65. After completion of the simple release and repositioning operations, the conventional folding procedure, described above, is followed to place the tow coupler in the collapsed configuration of FIG. 10. With the improvements of the invention, additional space is provided between side-bars 26 and 27 to accommodate the shock absorber of the invention while maintaining the compact configuration of the original folding tow coupler concept.

To return the improved folding tow coupler to the expanded configuration for use, the described folding steps are reversed, quickly and easily preparing the tow coupler for connection to a towing vehicle. Once operational, the towing vehicle such as the self-propelled motor home 13 can tow the towed vehicle such as automobile 15 by the tow coupler without transmission of shock to either of the vehicles. It should be noted that the reference figures explaining the operation of the improvement only show one pivot plate, 59, welded to the top of the shock absorbing apparatus; it is considered to be within the scope of this invention to add a second parallel pivot plate (59A—not shown) which is welded to the underneath side of the shock absorbing apparatus. This second plate, in which all aperture would match and line up with the upper plate, would improve the strength and stability of the folding tow bar.

Although this invention has been described with a certain degree of particularity, it is understood that the present disclosure if made only by way of example of the invention and that numerous changes in the details of construction and the combination and arrangement of parts may be resorted to without departing from the spirit and the scope of the invention as claimed.

What is claimed is:

1. A shock absorbing apparatus, comprising:
   a) a hitch to be releasably coupled and in pivotal relationship to a towing vehicle:
   b) an inner member having first and second ends, said inner member first end being coupled to said hitch, said inner member having a longitudinal axis extending between said inner member first and second ends, said inner member being rectangular in transverse cross section, said inner member having side walls;
   c) an outer member having first and second ends, said outer member first end being open to an interior cavity that extends from said outer member first end to said outer member second end, said second end having a wall, said outer member having a longitudinal axis extending between said outer member first and second ends, said outer member having respective side walls, said inner member having a majority of its longitudinal length being disposed in said cavity with said inner member second end being located in said cavity and said inner member first end being located outside of said cavity, said cavity being rectangular in transverse cross section such that said inner member is slidingly received by said second member and said inner member can telescope with respect to said outer member:
   d) an extension member having respective first and second ends, said extension member first end being coupled to said inner member second end and extending from said inner member second end through an opening in said wall at said second end of said outer member to the outside of said outer member, wherein said extension member second end is located outside of said outer member, said extension member second end having a stop;
   e) a first spring located inside of said outer member cavity on said extension member and extending between said wall at said second end of said outer member and said inner member second end:
   a second spring located outside of said outer member cavity on said extension member and extending between said wall and said extension member stop; and,
   g) connection means attached to the outside wall of said outer member for attaching the shock absorbing apparatus to a tow coupler:
   h) bearing means between said outer member and said inner member for reducing the effects of friction between said members.

2. The shock absorbing apparatus of claim 1 wherein said connection means is a nose plate containing openings for attachment to another element and welded to the top side of said outer member.

3. The shock absorbing apparatus of claim 1 wherein said connection means is a nose plate containing openings for attachment to another element and welded to the top side of said outer member.

4. The shock absorbing apparatus of claim 1 wherein said connection means is a nose plate containing openings for attachment to another element and welded to the bottom side of said outer member.

5. The shock absorbing apparatus of claim 1 wherein said connection means comprises two plates, containing openings for attachment to another element, and welded to opposite outer sides of said outer member.

6. The shock absorbing apparatus of claim 1 wherein said connection means comprise two parallel nose plates, containing openings for attachment to another element, and welded to top and bottom outer sides of said outer member.

7. The shock absorbing apparatus of claim 1 further having a top and a bottom wherein said bearing means comprises a plurality of tabs welded to opposite side walls of said outer member forming a pair of tabs wherein said tabs extend above the top and bottom side walls of said outer member wherein a plurality of openings are cut transverse between said pair of tabs on said top side wall and said bottom side wall of said outer member and wherein a transverse bearing surface lies between each pair of tabs such that said inner member is glidingly received by said transverse bearing surface.

8. The shock absorbing apparatus of claim 7 wherein said transverse bearing surface is of the sleeve-bushing type.

9. The shock absorbing apparatus of claim 7 wherein said transverse bearing surface is of the roller type.

10. The shock absorbing apparatus of claim 7 wherein said tabs have openings adapted to receive a mounting means for said transverse bearing surface.

11. The shock absorbing apparatus of claim 10 wherein said mounting means is a bolt and nut.

12. The shock absorbing apparatus of claim 10 wherein said mounting means is a dowel and keeper.

13. The shock absorbing apparatus of claim 1 wherein said bearing means comprises a rectangular sleeve of low friction material placed within said cavity of said outer member, said sleeve having an inner and outer wall, said sleeve extending between said first end and said second end of said outer member, with said inner member slidingly bearing against said sleeve.

14. The shock absorbing apparatus of claim 13 wherein said low friction sleeve is formed from Teflon ®.

15. The shock absorbing apparatus of claim 1 wherein said bearing means comprises a low friction coating affixed to said outer member, with said inner member slidingly bearing against said coating.

16. The shock absorbing apparatus of claim 15 wherein said low friction coating is formed from Teflon ®.

17. The shock absorbing apparatus of claim 15 further comprising a low friction coating affixed to said inner member.

18. The shock absorbing apparatus of claim 17 wherein said low friction coating is formed from Teflon ®.

19. The shock absorbing apparatus of claim 1 wherein said bearing means comprises a low friction coating affixed to said inner member, with said outer member slidingly bearing against said coating.

20. The shock absorbing apparatus of claim 19 wherein said low friction coating is formed from Teflon ®.

21. The shock absorbing apparatus of claim 1 wherein said bearing means comprises said inner member slidingly bearing against said outer member such that said inner member side walls are in contact with said outer member side walls.

* * * * *